US010477451B2

(12) United States Patent
Kim et al.

(10) Patent No.: US 10,477,451 B2
(45) Date of Patent: Nov. 12, 2019

(54) METHOD FOR ACCESSING WIRELESS MEDIUM IN WIRELESS LOCAL AREA NETWORK AND WIRELESS DEVICE USING THE SAME

(71) Applicant: LG ELECTRONICS INC., Seoul (KR)

(72) Inventors: Suhwook Kim, Seoul (KR); Kiseon Ryu, Seoul (KR); Hyunhee Park, Seoul (KR); Jeongki Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 176 days.

(21) Appl. No.: 15/582,425

(22) Filed: Apr. 28, 2017

(65) Prior Publication Data

US 2017/0318518 A1 Nov. 2, 2017

Related U.S. Application Data

(60) Provisional application No. 62/329,150, filed on Apr. 28, 2016.

(51) Int. Cl.
*H04W 40/24* (2009.01)
*H04W 74/00* (2009.01)
*H04W 84/12* (2009.01)
*H04W 88/08* (2009.01)
*H04W 88/02* (2009.01)

(52) U.S. Cl.
CPC ......... *H04W 40/24* (2013.01); *H04W 74/002* (2013.01); *H04W 84/12* (2013.01); *H04W 88/02* (2013.01); *H04W 88/08* (2013.01)

(58) Field of Classification Search
None
See application file for complete search history.

(56) References Cited

U.S. PATENT DOCUMENTS

| 2016/0021678 A1* | 1/2016 | Merlin | H04W 72/1268 |
| | | | 370/329 |
| 2016/0087775 A1* | 3/2016 | Hedayat | H04L 1/12 |
| | | | 370/329 |
| 2016/0285526 A1* | 9/2016 | Hedayat | H04B 7/0452 |

OTHER PUBLICATIONS

"IEEE Standard for Information technology, Telecommunications and information exchange between system, Local and metropolitan area networks, Specific requirements",IEEE P802.11-REVmc/D2.0, Oct. 2013, 4 pages.

(Continued)

*Primary Examiner* — James P Duffy
(74) *Attorney, Agent, or Firm* — Lee, Hong, Degerman, Kang & Waimey

(57) ABSTRACT

According to an embodiment of the present specification, a method for accessing a wireless medium in a wireless local area network (LAN) system includes: receiving, by a wireless device, from an access point (AP) a packet including identification information indicating a receiving device which solicits a response frame, wherein the identification information is information included in a physical layer (PHY) header of the packet, the packet includes a broadcast frame, and the broadcast frame includes duration information indicating a time for deferring the access to the wireless medium; and if the wireless device is not the receiving device indicated by the identification information, setting, by the wireless device, a network allocation vector (NAV) on the basis of the duration information.

8 Claims, 17 Drawing Sheets

(56) References Cited

OTHER PUBLICATIONS

"Draft Standard for Information Technology, Telecommunications and information exchange between systems, Local and metropolitan area networks, Specific requirements", IEEE P802.11 ax/D1.0, Nov. 2016, 4 pages.

* cited by examiner

METHOD FOR ACCESSING WIRELESS MEDIUM IN WIRELESS LOCAL AREA NETWORK AND WIRELESS DEVICE USING THE SAME

CROSS-REFERENCE TO RELATED APPLICATIONS

Pursuant to 35 U.S.C. § 119(e), this application claims the benefit of U.S. Provisional Patent Application No. 62/329,150, filed on Apr. 28, 2016 the contents of which are hereby incorporated by reference herein in its entirety.

BACKGROUND OF THE INVENTION

Field of the Invention

The present specification relates to wireless communication, and more particularly, to a method for accessing a wireless medium in a wireless local area network (WLAN) system, and a wireless device using the method.

Related Art

A next-generation wireless local area network (WLAN) has a purpose of: 1) improving an institute of electrical and electronics engineers (IEEE) 802.11 physical (PHY) layer and a medium access control (MAC) layer in bands of 2.4 GHz and 5 GHz; 2) increasing spectrum efficiency and area throughput; and 3) improving performance in actual indoor and outdoor environments such as an environment in which an interference source exists, a dense heterogeneous network environment, and an environment in which a high user load exists, and the like.

An environment primarily considered in the next-generation WLAN is a dense environment in which many access points (APs) and stations (STAs) are present, and improvement of the spectrum efficiency and the area throughput is under discussion in such a situation. In particular, in addition to the indoor environment, substantial performance improvement is concerned in the outdoor environment which is not significantly considered in the existing WLAN.

Specifically, a scenario such as wireless office, smart home, stadium, hotspot, or the like is concerned in the next-generation WLAN. On the basis of a corresponding scenario, performance improvement of the WLAN system is under discussion in the environment in which the APs and the STAs are densely present.

SUMMARY OF THE INVENTION

The present specification relates to a method for accessing a wireless medium in a wireless local area network (LAN) system. The method for accessing the wireless medium in the WLAN system according to the present embodiment may include: receiving, by a wireless device, from an access point (AP) a packet including identification information indicating a receiving device which solicits a response frame, wherein the identification information is information included in a physical layer (PHY) header of the packet, the packet includes a broadcast frame, and the broadcast frame includes duration information indicating a time for deferring the access to the wireless medium; and if the wireless device is not the receiving device indicated by the identification information, setting, by the wireless device, a network allocation vector (NAV) on the basis of the duration information.

DESCRIPTION OF EXEMPLARY EMBODIMENTS

The aforementioned features and following detailed descriptions are provided for exemplary purposes to facilitate explanation and understanding of the present specification. That is, the present specification are not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

Figure 1A:
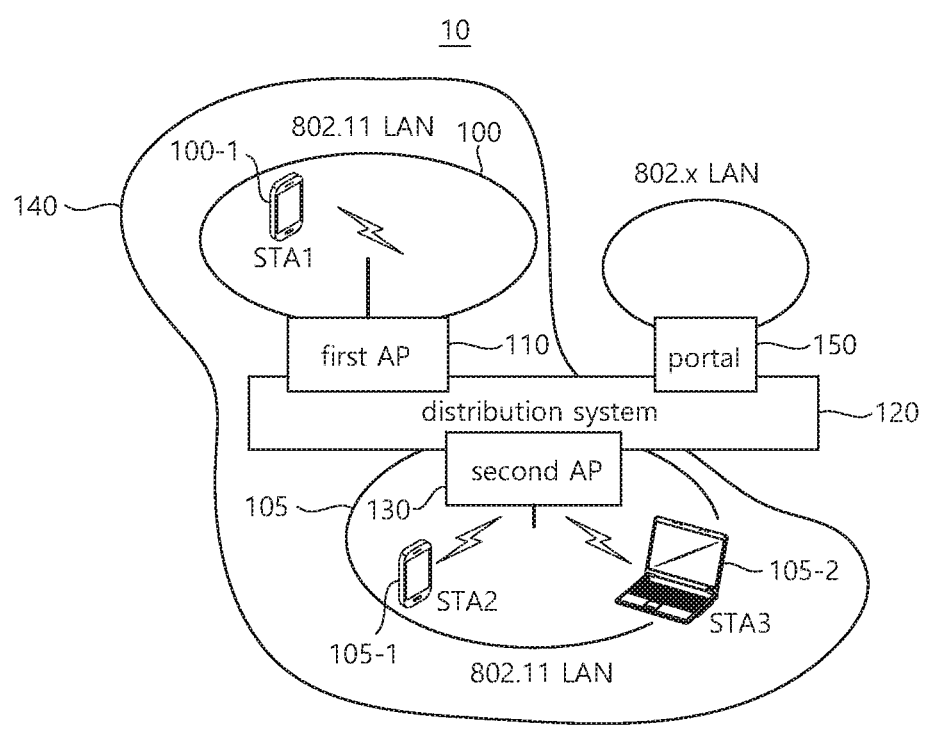
FIG. 1A and FIG. 1B are a conceptual view illustrating the structure of a wireless local area network.
Figure 1B:
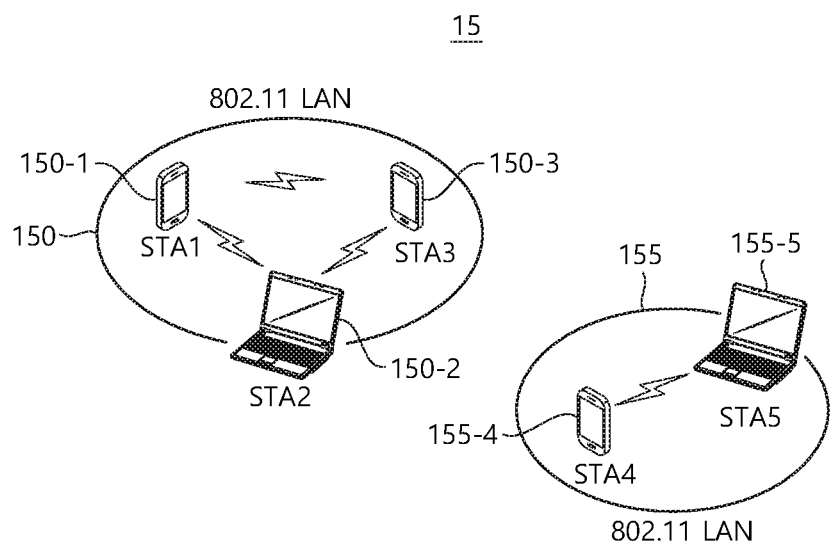

FIG. 1A and FIG. 1B are a conceptual view illustrating the structure of a wireless local area network (WLAN). FIG. 1A illustrates the structure of an infrastructure basic service set (BSS) of institute of electrical and electronic engineers (IEEE) 802.11.

Referring the FIG. 1A, the WLAN system (10) of the FIG. 1A may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, The BSS 100 may include one AP 110 and one or more STAs 100-1 which may be related with one AP 110. The BSS 105 may include one or more STAs 105-1 and 105-2 which may be related with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1A, a network between the APs 110 and 130 and a network between the APs 110 and 130 and the STAs 100-1, 105-1, and 105-2 may be implemented.

FIG. 1B illustrates a conceptual view illustrating the IBSS.

Referring to FIG. 1B, a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1B, the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
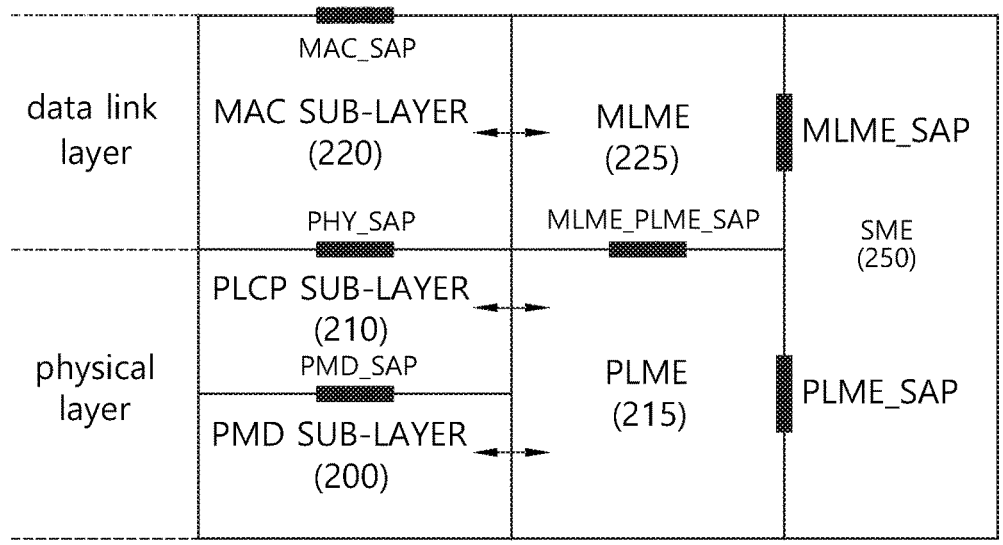
FIG. 2 is a diagram illustrating an example of a PPDU used in an IEEE standard.

FIG. 2 is a conceptual view illustrating a layered architecture of a WLAN system supported by IEEE 802.11. Referring to FIG. 2, the layered architecture of the WLAN system may include a physical medium dependent (PMD) sub-layer 200, a physical layer convergence procedure (PLCP) sub-layer 210, and a medium access control (MAC) sub-layer 220.

The PLCP sub-layer 200 may serve as a transmission interface for transmitting/receiving data between a plurality of STAs. The PLCP sub-layer 210 is implemented such that the MAC sub-layer 220 is operated with a minimum dependency with respect to the PMD sub-layer 200.

The PMD sub-layer 200, the PLCP sub-layer 210, and the MAC sub-layer 220 may conceptually include respective management entities. For example, the management entity of the MAC sub-layer 220 is referred to as a MAC layer management entity (MLME) 225. The management entity of the physical layer is referred to as a PHY layer management entity (PLME) 215.

The management entities may provide an interface for performing a layer management operation. For example, the PLME 215 may be connected to the MLME 225 to perform a management operation of the PLCP sub-layer 210 and the PMD sub-layer 200. The MLME 225 may be connected to the PLME 215 to perform a management operation of the MAC sub-layer 220.

An STA management entity (SME) 250 may exist to perform a proper MAC layer operation. The SME 250 may be operated as a constitutional element independent of each layer. The PLME 215, the MLME 225, and the SME 250 may mutually transmit and receive information on the basis of a primitive.

The operation of each sub-layer is briefly described as follows. For example, the PLCP sub-layer 210 delivers a MAC protocol data unit (MPDU) received from the MAC sub-layer 220 according to an instruction of the MAC layer between the MAC sub-layer 220 and the PMD sub-layer 200 to the PMD sub-layer 200 or delivers a frame from the PMD sub-layer 200 to the MAC sub-layer 220.

The PMD sub-layer 200 is a PLCP sub-layer, and may transmit and receive data between a plurality of STAs through a wireless medium. The MPDU delivered from the MAC sub-layer 220 is referred to as a physical service data unit (PSDU) in the PLCP sub-layer 210. Although the MPDU is similar to the PSDU, if an aggregated MPDU (AMPDU) obtained by aggregating a plurality of MPDUs is delivered, the MPDUs may be individually different from the PSDUs.

The PLCP sub-layer 210 adds an additional field including information required by a transceiver of a physical layer in a process of receiving the PSDU from the MAC sub-layer 220 and delivering it to the PMD sub-layer 200. In this case, the field added to the PSDU may be a PLCP preamble, a PLCP header, and tail bits required to return a convolution encoder to a zero state.

The PLCP sub-layer 210 adds the aforementioned fields to the PSDU to generate a PLCP protocol data unit (PPDU) and transmits the PPDU to a receiving station through the PMD sub-layer 200. The receiving station receives the PPDU to perform restoration by obtaining information required to restore data from the PLCP preamble and the PLCP header.

Figure 3:
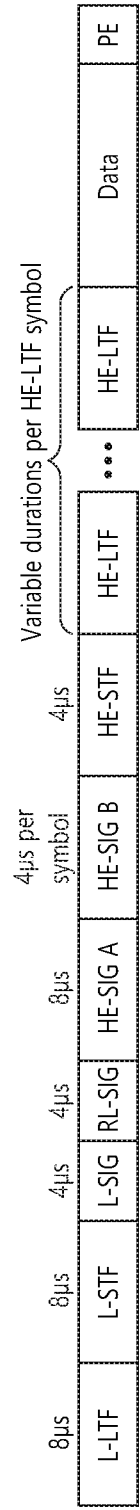
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
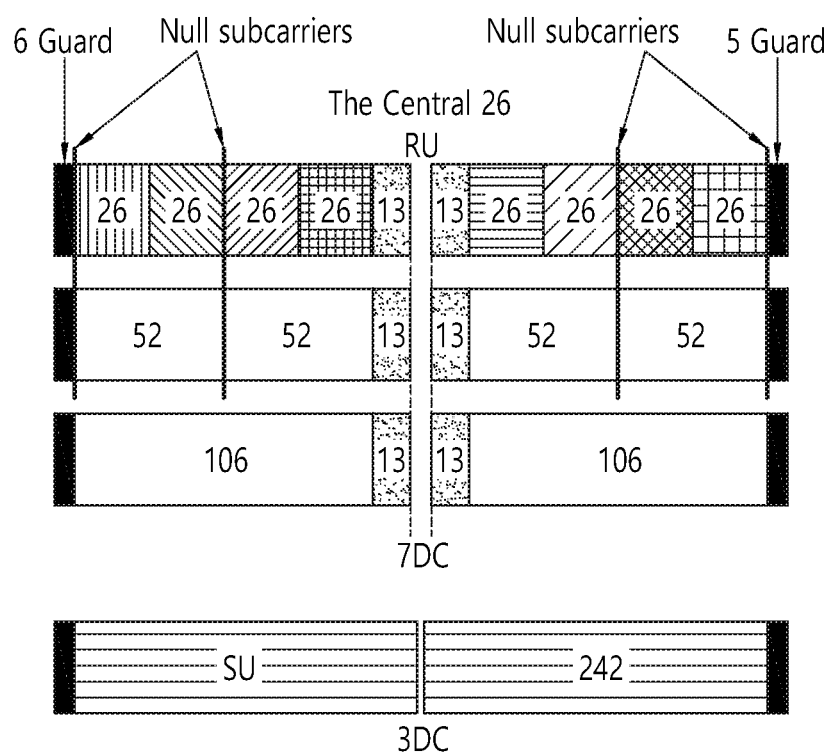
FIG. 4 is a diagram illustrating a layout of resource units used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
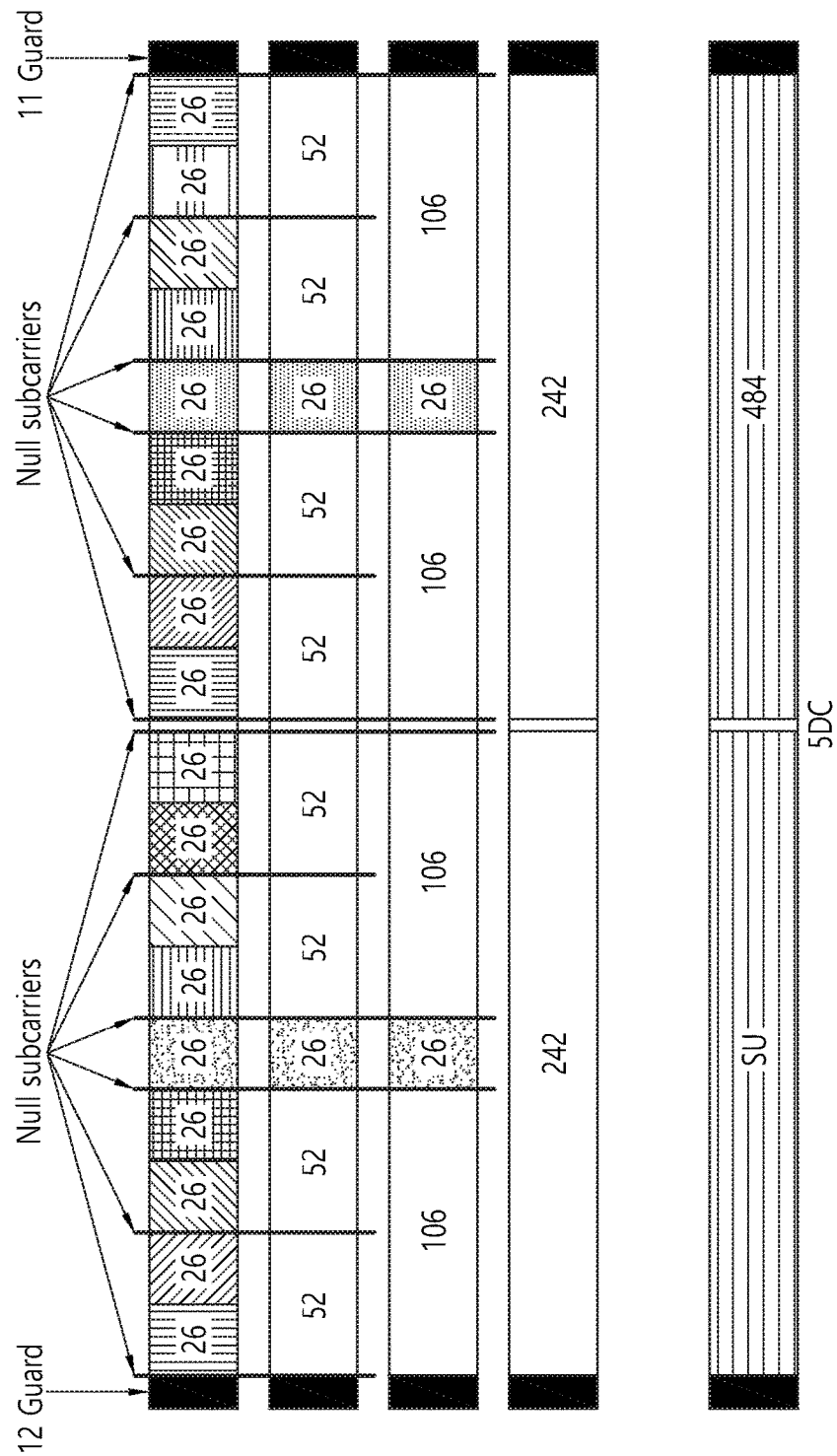
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
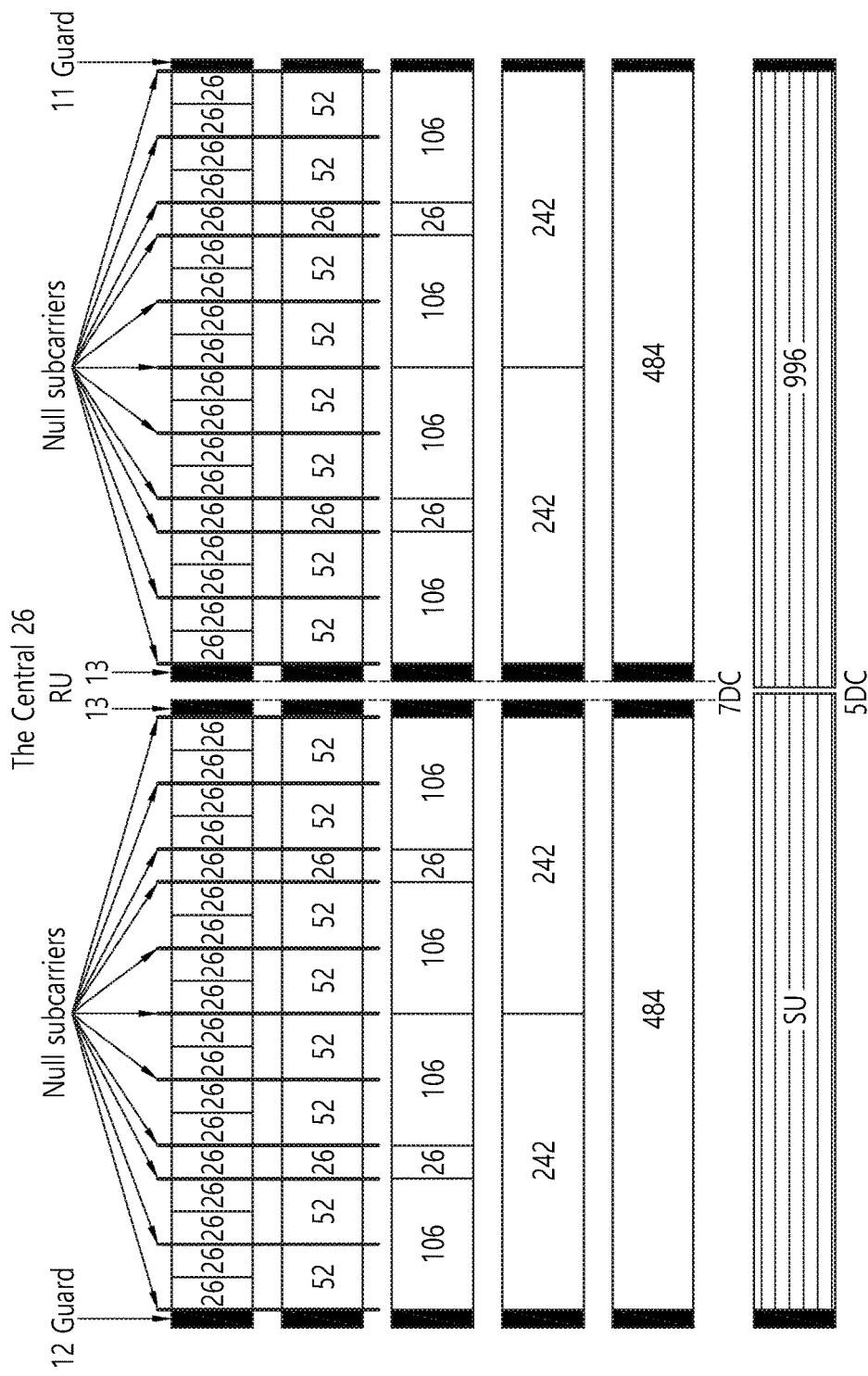
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
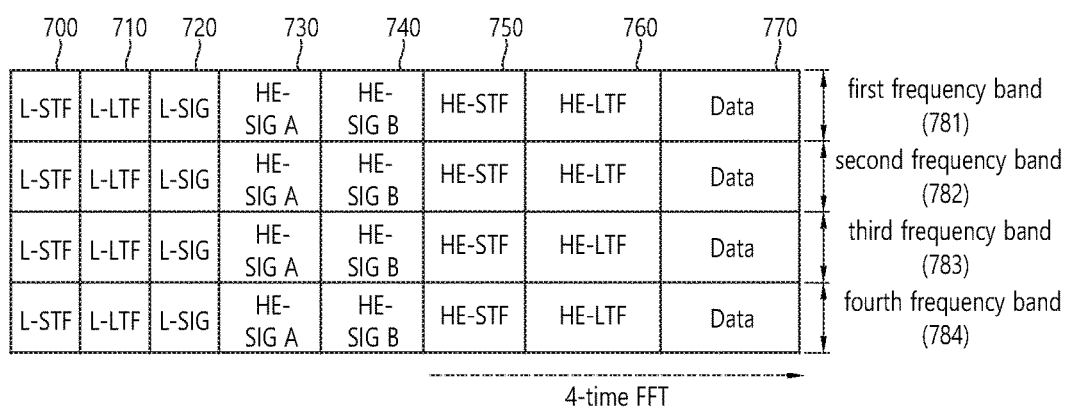
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

The HE-SIG-B 740 will be described below in a greater detail with reference to FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy WLAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy WLAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the WLAN system to which the embodiment of the present description is applied, the whole bandwidth may be used for downlink transmission to one STA and uplink transmission to one STA. Further, in the WLAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the WLAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the WLAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the WLAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy WLAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel Therefore, since the STA may transmit the frame only to the primary channel, the STA receives a limit for transmission of the frame through the multiple channels. That is, in the legacy WLAN system, the primary channel rule used for allocating the multiple channels may be a large limit in obtaining a high throughput by operating the wider bandwidth in a current wireless LAN environment in which the OBSS is not small.

In order to solve the problem, in the embodiment, a WLAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
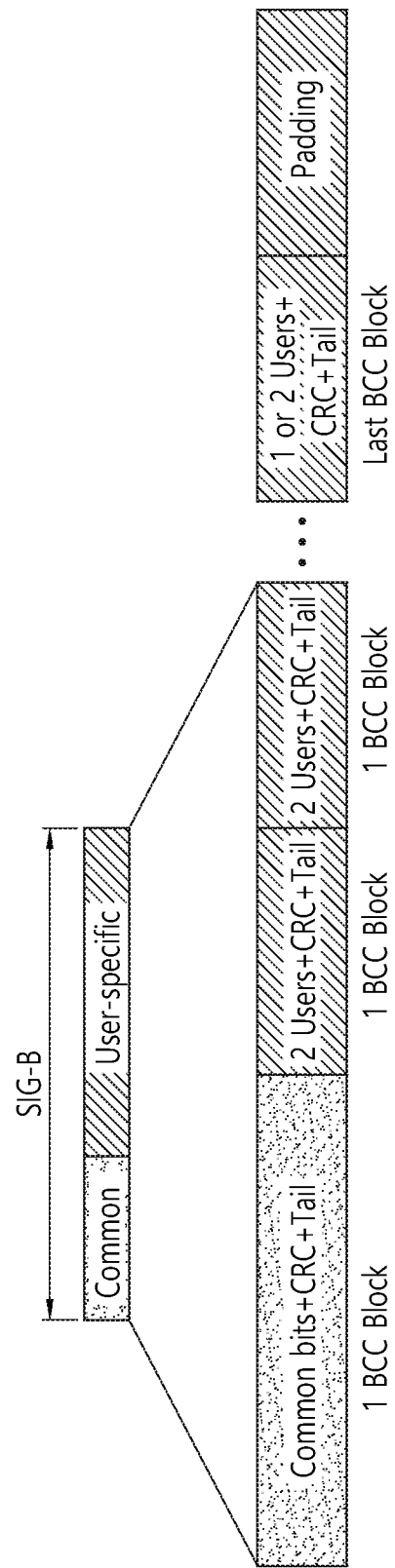
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
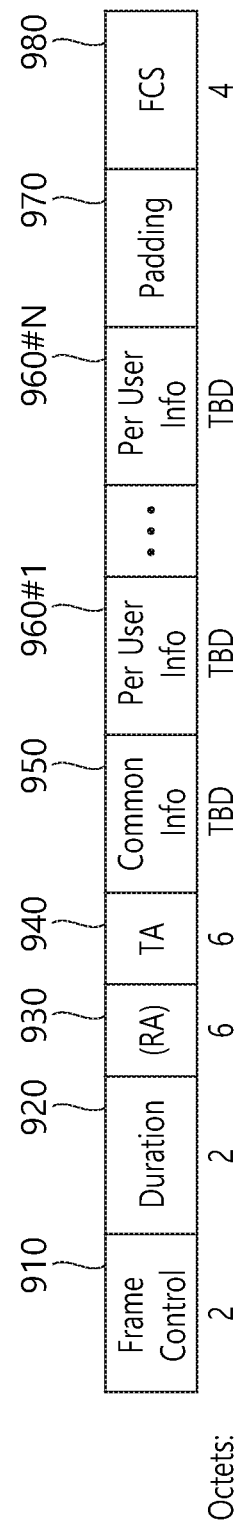
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
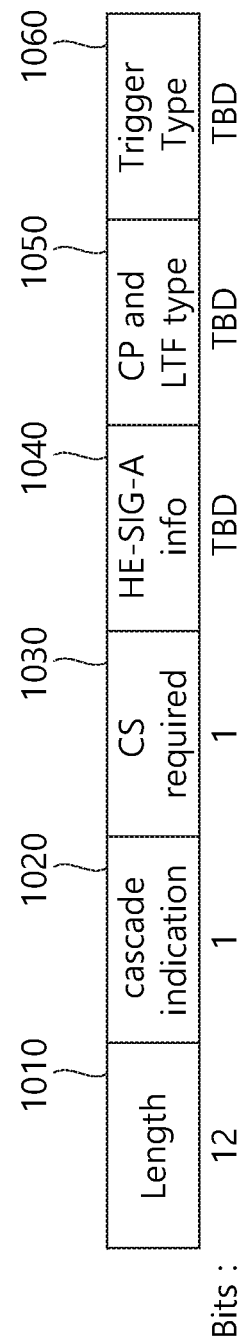
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
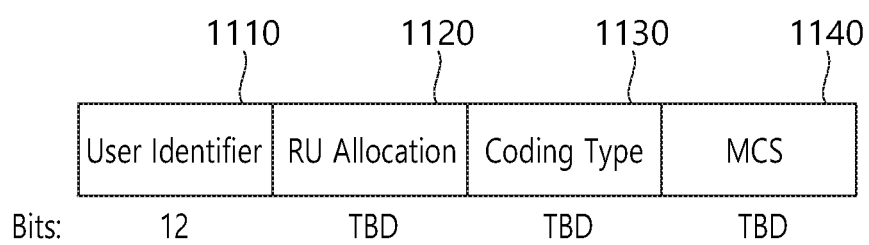
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

In the present specification, the user identifier field of FIG. 11 may be referred to as an association identifier (hereinafter, AID) field.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9.

For example, when BCC coding may is applied to the uplink PPDU, the coding type field 1130 may be set to '1', and when the LDPC coding is applied, the coding type field 1130 may be set to '0'.

Figure 12A:
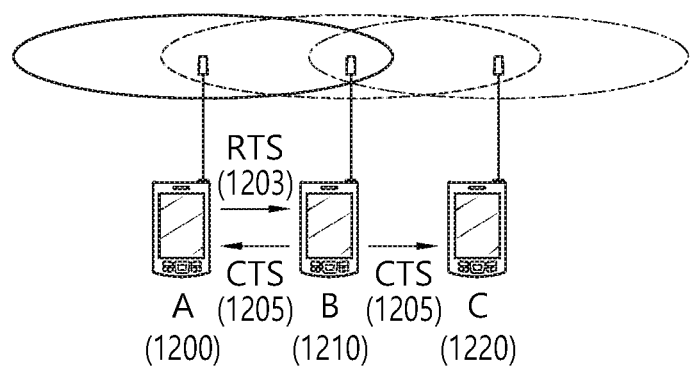
FIG. 12A and FIG. 12B are a conceptual view illustrating a method of using a request to send (RTS) frame and a clear to send (CTS) frame to resolve a hidden node issue and an exposed node issue.
Figure 12B:
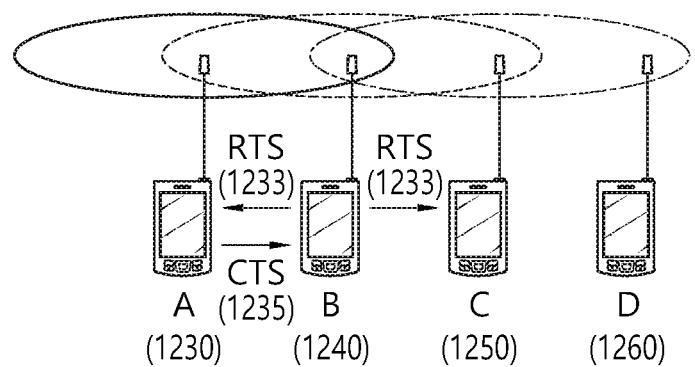

FIG. 12A and FIG. 12B are a conceptual view illustrating a method of using an RTS frame and a CTS frame to resolve a hidden node issue and an exposed node issue.

Referring to FIG. 12A and FIG. 12B, a short signaling frame such as a request to send (RTS) frame and a clear to send (CTS) frame may be used to resolve a hidden node issue and an exposed node issue. Neighboring STAs may know whether data is transmitted or received between two STAs on the basis of the RTS frame and the CTS frame.

FIG. 12A illustrates a method of transmitting an RTS frame 1203 and a CTS frame 1205 to resolve a hidden node issue.

It is assumed that both an STA A 1200 and an STA C 1220 intent to transmit data frames to an STA B 1210. For example, the STA A 1200 may transmit the RTS frame 1203 to the STA B 1210 before transmission of the data frame, and the STA B 1210 may transmit the CTS frame 1205 to the STA A 1200.

The STA C 1220 may overhear the CTS frame 1205 and know frame transmission from the STA A 1200 to the STA B 1210 through a medium. The STA C 1220 may configure a network allocation vector (NAV) until data frame transmission from the STA A 1200 to the STA B 1210 is terminated. By using this method, an inter-frame collision caused by a hidden node can be prevented.

FIG. 12B illustrates a method of transmitting an RTS frame 1233 and a CTS frame 1235 to resolve an exposed node issue.

For example, an STA C 1250 may determine whether a collision occurs when a frame is transmitted to another STA D 1260 on the basis of monitoring of the RTS frame 1233 and the CRS frame 1235 of an STA A 1230 and an STA B 1240.

In addition, the STA B 1240 may also transmit the RTS frame 1233 to the STA A 1230, and the STA A 1230 may transmit the CTS frame 1235 to the STA B 1240. The STA C 1250 may overhear only the RTS frame 1233 transmitted by the STA B 1240. On the contrary, the CTS frame 1235 transmitted by the STA A 1230 cannot be overheard.

Eventually, the STA C 1250 may determine that the STA A 1230 is located outside a carrier sensing range of the STA C 1250. Accordingly, the STA C 1250 may transmit data to the STA D 1260.

An RTS frame format and a CTS frame format are disclosed in the 8.3.1.2 RTS frame format and 8.3.1.3 CTS frame format of IEEE P802.11-REVmcTM/D2.0, October 2013.

Figure 13:
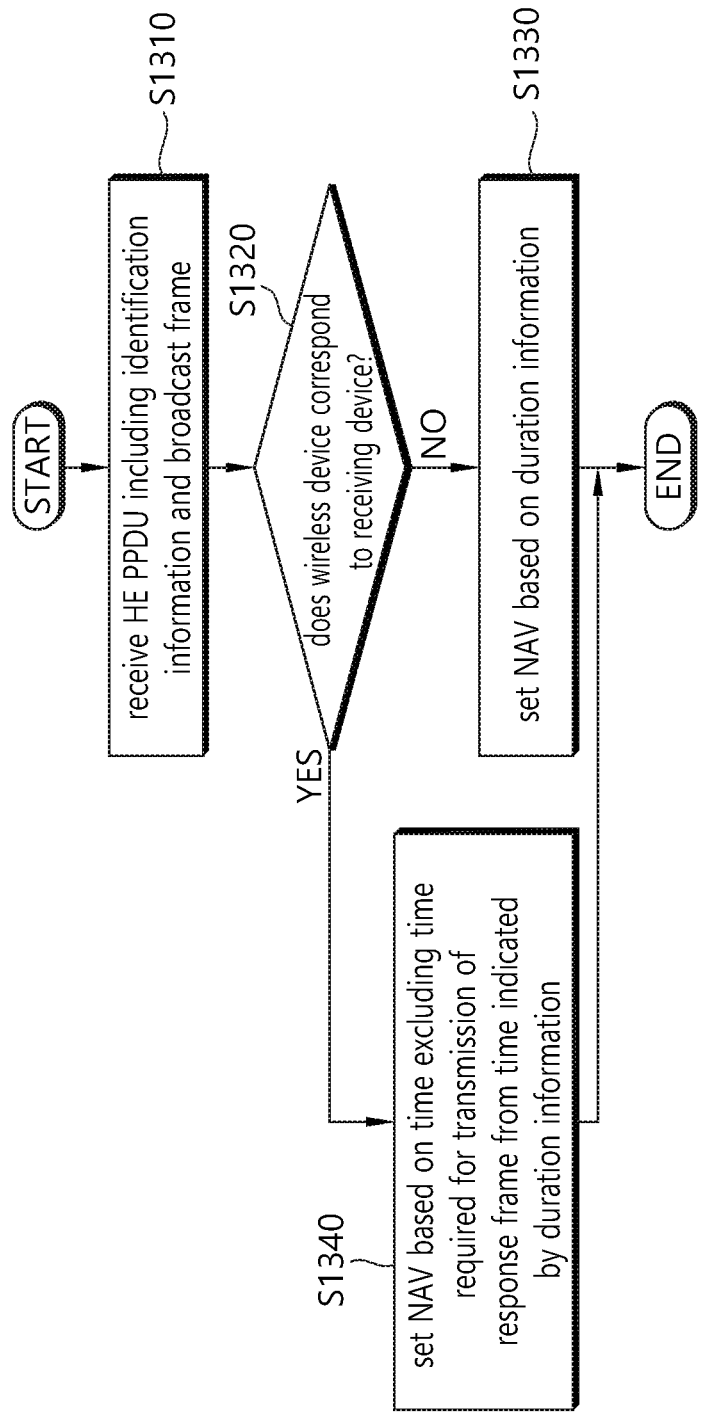
FIG. 13 is a flowchart illustrating a method for accessing a wireless medium in a wireless local area network (LAN) system according to the present embodiment.

FIG. 13 is a flowchart illustrating a method for accessing a wireless medium in a wireless local area network (LAN) system according to the present embodiment.

Referring to FIG. 1 to FIG. 13, in step S1310, a user STA may receive from an access point (AP) a packet including identification information indicating a receiving device which solicits a response frame.

Referring to FIG. 3 to FIG. 13, the packet according to the present embodiment may be understood as the aforementioned high efficiency (HE) PLCP protocol data unit (PPDU) format of FIG. 3.

For example, a PHY header of the HE-PPDU for a multiple user (MU) may include a high efficiency-signal A (HE-SIG-A) field and a high efficiency-signal-B (HE-SIG-B) field.

For example, a PHY preamble of the HE-PPDU for the MU may include a high efficiency-short training (HE-STF) field and a high efficiency-long training field (HE-LTF) field.

Referring to FIG. 3, FIG. 7, and FIG. 13, the identification information according to the present embodiment may be information included in an HE-SIG-B field 740 of the PHY header located in a start portion of the packet. That is, according to the present embodiment, the identification information included in the HE-SIG-B field 740 may indicate a plurality of receiving devices.

In addition, the packet may include a broadcast frame. For example, the broadcast frame may be included in the data field of FIG. 3. For instance, the broadcast frame may be understood as the trigger frame mentioned in FIG. 9 among various types of medium access control (MAC) frames.

Referring to FIG. 9 and FIG. 13, an RA field 930 of the broadcast frame (i.e., the trigger frame) may be set to a value corresponding to a broadcast scheme. A value for indicating a time for deferring an access to a wireless medium may be set in a duration field 920 of the broadcast frame (i.e., the trigger frame). For example, the user STA other than the receiving device may set an NAV by referring to the duration field of the broadcast frame (i.e., the trigger frame) to defer the access to the wireless medium.

In step S1320, the user STA may determine whether the user STA is the receiving device on the basis of the identification information of the received packet. The receiving device may be understood as a device to which transmission is solicited in response to the packet transmitted by the AP.

In addition, when information on a plurality of STAs is included in the identification information, a plurality of receiving devices may be indicated through the received packet. Each receiving device may be a device identified by the identification information included in the packet.

In this case, each receiving device may transmit a response frame (e.g., an uplink data frame or a CTS frame) in response to the reception of the packet. If it is determined that the user STA is not the receiving device indicated by this packet, step S1330 may be performed.

In step S1330, the user STA may set the NAV on the basis of the duration field 920 of the broadcast frame (i.e., the trigger frame). That is, the user STA other than the receiving device of the packet may defer the access to the wireless channel during a time corresponding to the value set in the NAV.

For example, the user STA may perform a countdown operation on the basis of the value set in the NAV to defer the access to the wireless channel until the value set in the NAV becomes '0'.

To receive the frame transmitted using the broadcast scheme, the user STA of the conventional WLAN system does not set the NAV in general by considering the frame transmitted using the broadcast scheme as a frame addressed to the user STA.

However, according to step S1330 of the present embodiment, although the broadcast frame to be transmitted using the broadcast scheme is received, the user STA other than the receiving device may set the NAV by referring to the duration field of the broadcast frame. If the user STA is the receiving device indicated by this packet, step S1340 may be performed.

In step S1340, since this is a case where the user STA is the receiving device, the response frame may be transmitted to the AP in response to the reception of the packet. The user STA which is the receiving device may set the NAV on the basis of a time excluding a time required for transmission of the response frame from a time indicated by the duration field of the trigger frame.

Figure 14:
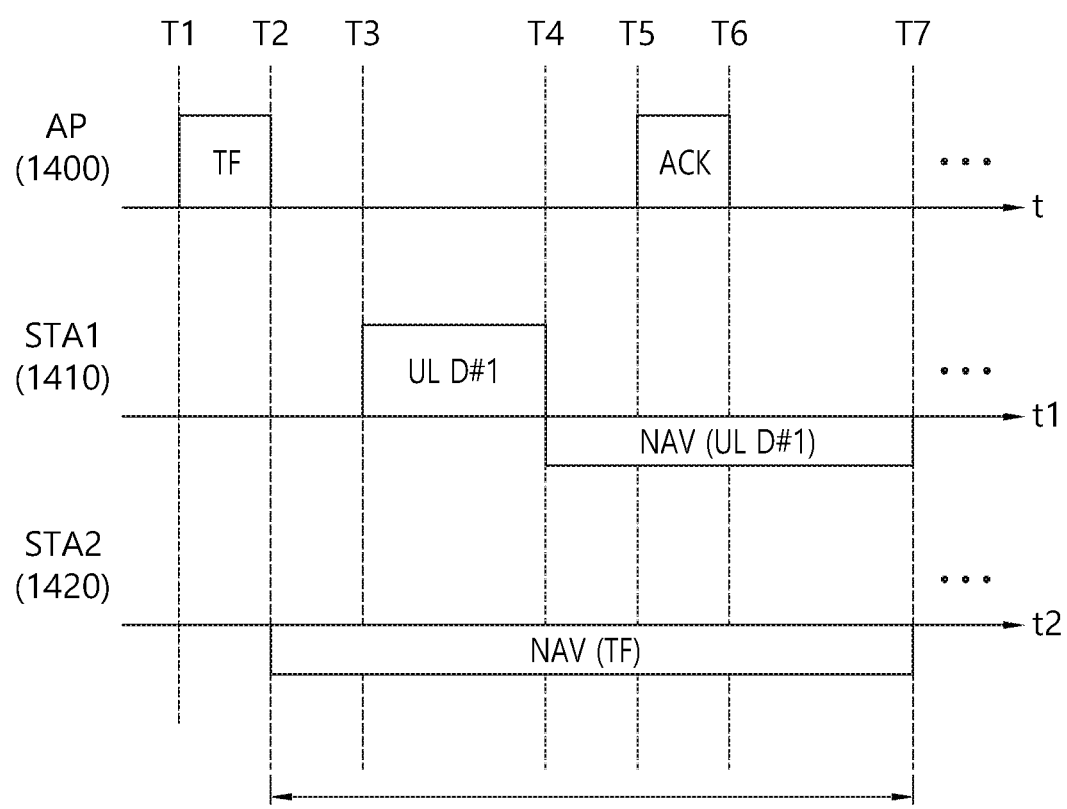
FIG. 14 illustrates a method for accessing a wireless medium on the basis of a trigger frame in a WLAN system according to the present embodiment.

FIG. 14 illustrates a method for accessing a wireless medium on the basis of a trigger frame in a WLAN system according to the present embodiment. Referring to FIG. 1 to FIG. 14, a horizontal axis of an AP 1400 may indicate a time t, and a vertical axis may be related with a presence of a frame to be transmitted by the AP 1400.

A horizontal axis of a first STA 1410 may indicate a time t1, and a vertical axis may be related with a presence of a frame to be transmitted by the first STA 1410. A horizontal axis of a second STA 1420 may indicate a time t2, and a vertical axis may be related with a presence of a frame to be transmitted by the second STA 1420.

In the present embodiment, each of the user STAs 1410 and 1420 may individually maintain an NAV which is a timer for deferring the access to the wireless medium. That is, upon receiving a frame, each of the user STAs 1410 and 1420 may update the NAV as a value set in a duration field (920 in case of FIG. 9) of the received frame.

In a first duration (T1 to T2), the AP 1400 may transmit a packet including a trigger frame (TF) for the plurality of user STAs. For example, the packet transmitted in the first duration (T1 to T2) may be understood as the HE PPDU of FIG. 3.

The AP 1400 may be understood as an entity which has acquired a transmission opportunity (TXOP) through contention for the wireless medium with respect to the different user STAs 1410 and 1420. In the present embodiment, the trigger frame (TF) of FIG. 14 may be assumed as a basic trigger frame. That is, a trigger type field 1060 of the common information field 950 of FIG. 9 may be set to '0' to indicate the basic trigger frame.

Referring to FIG. 9 and FIG. 14, in case of the basic trigger frame, the duration field 920 of the trigger frame (TF) may be set to a value corresponding to a time (e.g., T2 to T7 in case of FIG. 14) for the TXOP acquired by the AP 1400.

Referring to FIG. 9, FIG. 11, and FIG. 14, for uplink transmission, the basic trigger frame (TF) may include RU allocation information 1120 indicating a plurality of resource units individually allocated to a plurality of user STAs.

For clear and brief description of FIG. 14, it is assumed that the first user STA 1410 is indicated through identification information (HE-SIG-B field 740) of the packet including the basic trigger frame (TF) transmitted in the first duration (T1 to T2). In addition, it is assumed that a resource unit (RU) for the first user STA 1410 is transmitted through the RU allocation information 1120.

That is, the first user STA 1410 may be understood as a receiving device to which transmission of a response frame (i.e., UL #1) to the AP 1400 is solicited by a packet including the basic trigger frame (TF). The NAV setting of the user STA indicated through identification information (HE-SIG-B field 740) of the packet is described below.

In addition, it is assumed that the second user STA 1420 is not indicated through the identification information (HE-SIG-B field 740) of the packet including the basic trigger frame (TF). In addition, it is assumed that a resource unit (RU) for the second user STA 1420 is not allocated through the RU allocation information 1120.

That is, the second user STA 1420 not indicated through the identification information (HE-SIG-B field 740) of the packet may set an NAV for the second user STA 1420 by referring to the duration field 920 of the trigger frame (TF).

For example, the NAV for the second user STA 1420 may be set according to a time (e.g., T2 to T7 in case of FIG. 14) of a transmission opportunity (TXOP) corresponding to the duration field 920 of the trigger frame (TF).

A second duration (T2 to T3) may be an SIFS.

In a third duration (T3 to T4), the first user STA 1410 may transmit a first uplink frame UL#1 through an RU allocated by the basic trigger frame (TF). For example, the first uplink frame UL #1 may be a trigger-based PPDU.

In this case, the first user STA 1410 may set the NAV on the basis of a value corresponding to a time (T4 to T7) excluding a time (T2 to T4) required for transmission of the first uplink frame UL #1 from a time (T2 to T7) indicated by the duration field 920 of the basic trigger frame (TF).

A fourth duration (T4 to T7) may be an SIFS.

In a fifth duration (T5 to T6), the AP 1400 may transmit an ACK frame for informing successful reception of an uplink frame (UL #1, other UL frames are not shown) transmitted from the plurality of user STAs 1410 (other STAs are not shown) in response to the basic trigger frame (TF).

Although FIG. 14 is described on the basis of a case of the basic trigger frame (TF), it will be understood that the present specification is not limited to the above case.

That is, to indicate a multi-user (MU) request to send (RTS) frame, the trigger type field 1060 of the common information field 950 of the trigger frame (TF) may be set to '3'. Hereinafter, a method for accessing a wireless medium is described for a case where the trigger frame (TF) is the MU RTS frame.

An address for broadcast may be set in the RA field 930 of the MU RTS frame (TF). An address for an STA for transmitting the MU-RTS frame may be set in the TA field 940 of the MU RTS frame (TF).

Other fields (e.g., the length field 1010, the HE-SIG-A information field 1060, the coding type field 1130, and the MCS field 1140) included in the MU RTS frame (TF) may be configured as reserved fields.

In case of the MU RTS frame, it is assumed that the first user STA 1410 is indicated through the identification information (HE-SIG-B field 740) of the packet including the MU RTS frame (TF) transmitted in the first duration (T1 to T2). In addition, it is assumed that the RU for the first user STA 1410 is allocated through the RU allocation information 1120.

The first user STA 1410 may be understood as a receiving device to which transmission of a response frame (i.e., UL #1) to the AP 1400 is solicited by a packet including the MU RTS frame (TF). The NAV setting of the user STA indicated through identification information (HE-SIG-B field 740) of the packet is described below.

In addition, it is assumed that the second user STA 1420 is not indicated through the identification information (HE-SIG-B field 740) of the packet including the MU RTS frame (TF). In addition, it is assumed that a resource unit (RU) for the second user STA 1420 is not allocated through the RU allocation information 1120.

That is, the second user STA 1420 not indicated through the identification information (HE-SIG-B field 740) of the packet may set an NAV for the second user STA 1420 by referring to the duration field 920 of the MU RTS frame (TF).

For example, the NAV for the second user STA 1420 may be set according to a time (e.g., T2 to T7 in case of FIG. 14) of a transmission opportunity (TXOP) corresponding to the duration field 920 of the MU RST frame (TF).

The second duration (T2 to T3) may be an SIFS. In the third duration (T3 to T4), the first user STA 1410 may transmit a first uplink frame UL#1 through the RU allocated by the MU RTS frame (TF). For example, the first uplink frame (UL #1) may be understood as a non-HT PPUD or non HT duplicate PPDU including a clear to send (CTS) frame which is a response for the MU RTS frame (TF).

In this case, the first user STA 1410 may set the NAV on the basis of a value corresponding to a time (T4 to T7) excluding a time (T2 to T4) required for transmission of the first uplink frame UL #1 from a time (T2 to T7) indicated by the duration field 920 of the MU RTS frame (TF).

Although not shown specifically in FIG. 14, after transmitting the first uplink frame (UL #1) including a CTS frame, if there is no data transmitted from the AP 1400, the first user STA 1410 may release the set NAV.

Descriptions on the exchange of the MU RTS frame/CTS frame may be understood by referring to the section 9.3.1.23.4 of the standard document IEEE P802.11ax/D1.0 disclosed in November, 2016.

According to a method for accessing a wireless medium in a WLAN system based on the present specification, in order to decrease an overhead caused by an address field included in a MAC frame, an address of the MAC frame may be set to a broadcast, and a receiving device may be identified through a PHY preamble. Therefore, it will be understood that the W LAN system having improved performance can be provided.

Figure 15:
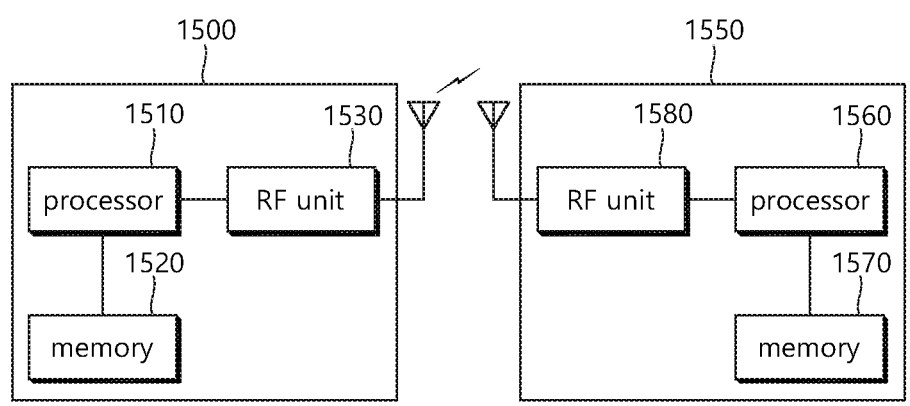
FIG. 15 is a block view illustrating a wireless device to which the exemplary embodiment of the present invention can be applied.

FIG. 15 is a block view illustrating a wireless device to which the exemplary embodiment of the present invention can be applied.

Referring to FIG. 15, as an STA that can implement the above-described exemplary embodiment, the wireless device may correspond to an AP or a non-AP station (STA). The wireless device may correspond to the above-described user or may correspond to a transmitting device transmitting a signal to the user.

The AP 1500 includes a processor 1510, a memory 1520, and a radio frequency (RF) unit 1530.

The RF unit 1530 is connected to the processor 1510, thereby being capable of transmitting and/or receiving radio signals.

The processor 1510 implements the functions, processes, and/or methods proposed in the present invention. For example, the processor 1510 may be implemented to perform the operations according to the above-described exemplary embodiments of the present invention. More specifically, among the operations that are disclosed in the exemplary embodiments of FIG. 1 to FIG. 14, the processor 1510 may perform the operations that may be performed by the AP.

The non-AP STA 1550 includes a processor 1560, a memory 1570, and a radio frequency (RF) unit 1580.

The RF unit 1580 is connected to the processor 1560, thereby being capable of transmitting and/or receiving radio signals.

The processor 1560 implements the functions, processes, and/or methods proposed in the present invention. For example, the processor 1560 may be implemented to perform the operations of the non-AP STA according to the above-described exemplary embodiments of the present invention. The processor may perform the operations of the non-AP STA, which are disclosed in the exemplary embodiments of FIG. 1 to FIG. 14.

The processor 1510 and 1560 may include an application-specific integrated circuit (ASIC), another chip set, a logical circuit, a data processing device, and/or a converter converting a baseband signal and a radio signal to and from one another. The memory 1520 and 1570 may include a read-only memory (ROM), a random access memory (RAM), a flash memory, a memory card, a storage medium, and/or another storage device. The RF unit 1530 and 1580 may include one or more antennas transmitting and/or receiving radio signals.

When the exemplary embodiment is implemented as software, the above-described method may be implemented as a module (process, function, and so on) performing the above-described functions. The module may be stored in the memory 1520 and 1570 and may be executed by the processor 1510 and 1560. The memory 1520 and 1570 may be located inside or outside of the processor 1510 and 1560 and may be connected to the processor 1510 and 1560 through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for accessing a wireless medium in a wireless local area network (LAN) system, the method comprising:
receiving, by a first wireless device, from a second wireless device operating an access point (AP), a packet including identification information related to a receiving device which solicits a response frame,
wherein the identification information is included in a physical layer (PHY) header of the packet,
wherein the packet includes a broadcast frame including duration information related to a first duration to defer access to the wireless medium;
determining, by the first wireless device, whether the first wireless device is the receiving device based on the identification information; and
when the first wireless device is the receiving device based on the determination, setting, by the first wireless device, a network allocation vector (NAV) during a second duration,
wherein the second duration is related to a length of time that a transmission time required for transmitting the response frame is excluded from the first duration.

2. The method of claim 1, wherein the identification information is included in an SIG-B field of the PHY header.

3. The method of claim 1, further comprising, performing, by the first wireless device, a countdown operation based on a value set in the NAV to defer the access to the wireless medium until the value set in the NAV becomes '0'.

4. The method of claim 1, wherein the broadcast frame further includes identification information related to a plurality of receiving devices and resource information related to a plurality of resource units individually allocated to the plurality of receiving devices.

5. The method of claim 1, wherein the broadcast frame is included in a data field of the packet.

6. The method of claim 1,
wherein the packet is a high efficiency (HE) physical layer convergence procedure (PLCP) protocol data unit (PPDU), and
wherein the broadcast frame is a medium access control (MAC) frame.

7. The method of claim 1, wherein the NAV is set based on the duration information, even if the broadcast frame is received when the first wireless device is not the receiving device.

8. A first wireless device using a method for accessing a wireless medium in a wireless local area network (LAN) system, the first wireless device comprising:
a transceiver for transmitting and receiving a radio signal; and
a processor operatively coupled to the transceiver, wherein the processor is configured for:
receiving from a second wireless device operating an access point (AP) a packet including identification information related to a receiving device which solicits a response frame,
wherein the identification information is included in a physical layer (PHY) header of the packet,
wherein the packet includes a broadcast frame including duration information related to a first duration to defer access to the wireless medium;
determining whether the first wireless device is the receiving device based on the identification information; and
when the first wireless device is the receiving device based on the determination, setting a network allocation vector (NAV) during a second duration,
wherein the second duration is related to a length of time that a transmission time required for transmitting the response frame is excluded from the first duration.

* * * * *